(12) United States Patent
Oettinger et al.

(10) Patent No.: US 7,599,011 B2
(45) Date of Patent: Oct. 6, 2009

(54) METHOD FOR SYNCHRONIZING AN IMAGE DATA SOURCE AND A RESONANT MIRROR SYSTEM TO GENERATE IMAGES

(75) Inventors: Eric Gregory Oettinger, Rochester, MN (US); James Eugene Noxon, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 819 days.

(21) Appl. No.: 11/336,042

(22) Filed: Jan. 20, 2006

(65) Prior Publication Data

US 2007/0171483 A1 Jul. 26, 2007

(51) Int. Cl.
*H04N 5/66* (2006.01)
*H04N 3/14* (2006.01)

(52) U.S. Cl. .............. 348/739; 348/781; 348/792; 359/213.1; 359/214.1; 359/224.1

(58) Field of Classification Search ......... 348/739–744, 348/781, 782, 790, 792, 756, 779, 785; 358/474; 345/204; 359/201.1, 201.2, 213.1, 214.1, 359/199.1, 198.1, 202.1, 224.1, 224.2; *H04N 5/66, H04N 9/12, 5/64, 9/31, 5/74, 3/14*
See application file for complete search history.

(56) References Cited

U.S. PATENT DOCUMENTS

| | | | | |
|---|---|---|---|---|
| 7,239,436 B2 * | 7/2007 | Oettinger et al. | ......... | 359/213.1 |
| 7,262,894 B2 * | 8/2007 | Oettinger et al. | ......... | 359/213.1 |
| 2006/0007362 A1 * | 1/2006 | Lee et al. | ............. | 348/744 |

* cited by examiner

*Primary Examiner*—Sherrie Hsia
(74) *Attorney, Agent, or Firm*—William B. Kempler; Wade J. Brady, III; Frederick J. Telecky, Jr.

(57) ABSTRACT

System and method for synchronizing the low speed mirror movement of a mirror display system with incoming frame or video signals, and synchronizing buffered lines of video data to the independently oscillating scanning mirror. According to one embodiment of the invention, the peak portions of the low speed cyclic drive signal are synchronized with the incoming frames of video by compressing or expanding the peak portion or turn around portion so that each video frame begins at the same location on the display screen. The actual position of the high frequency mirror is determined by sensors and a "trigger" signal is generated to distribute the signals for each scan line such that the scan lines are properly positioned on the display.

18 Claims, 7 Drawing Sheets

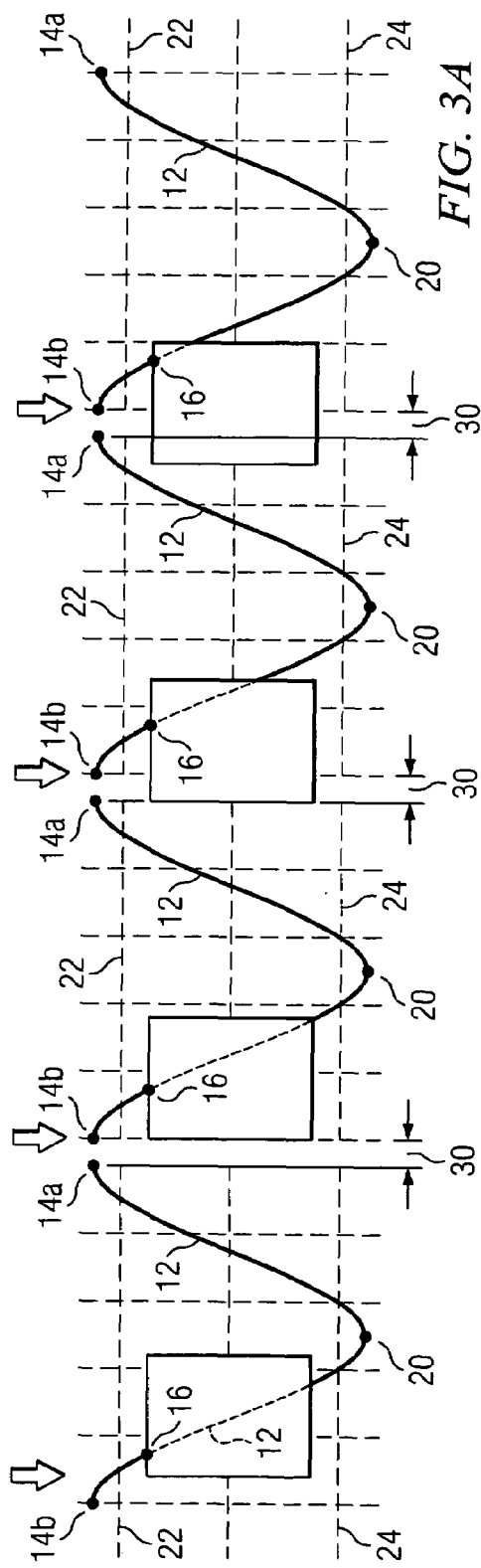
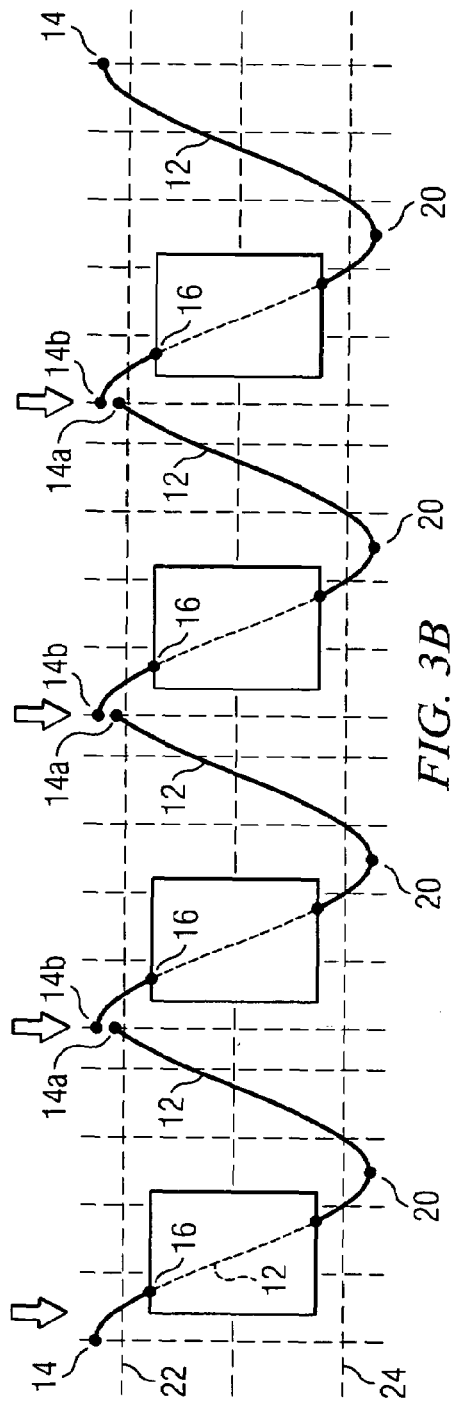
FIG. 3A
FIG. 3B

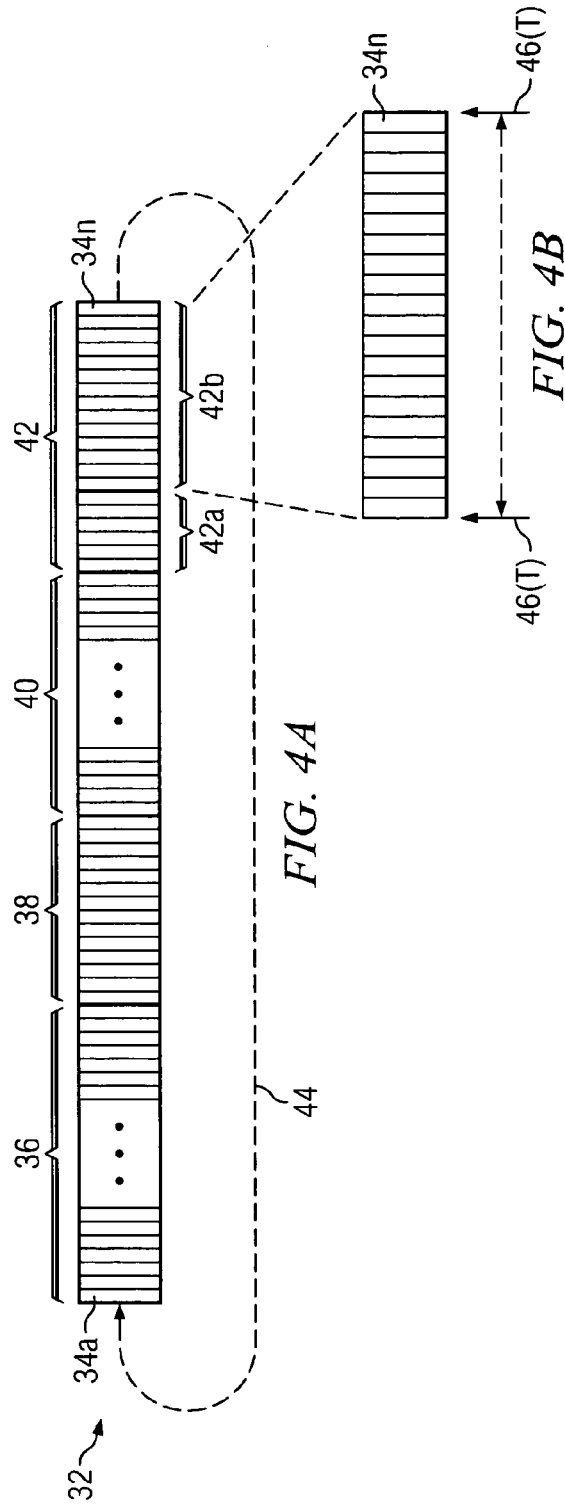
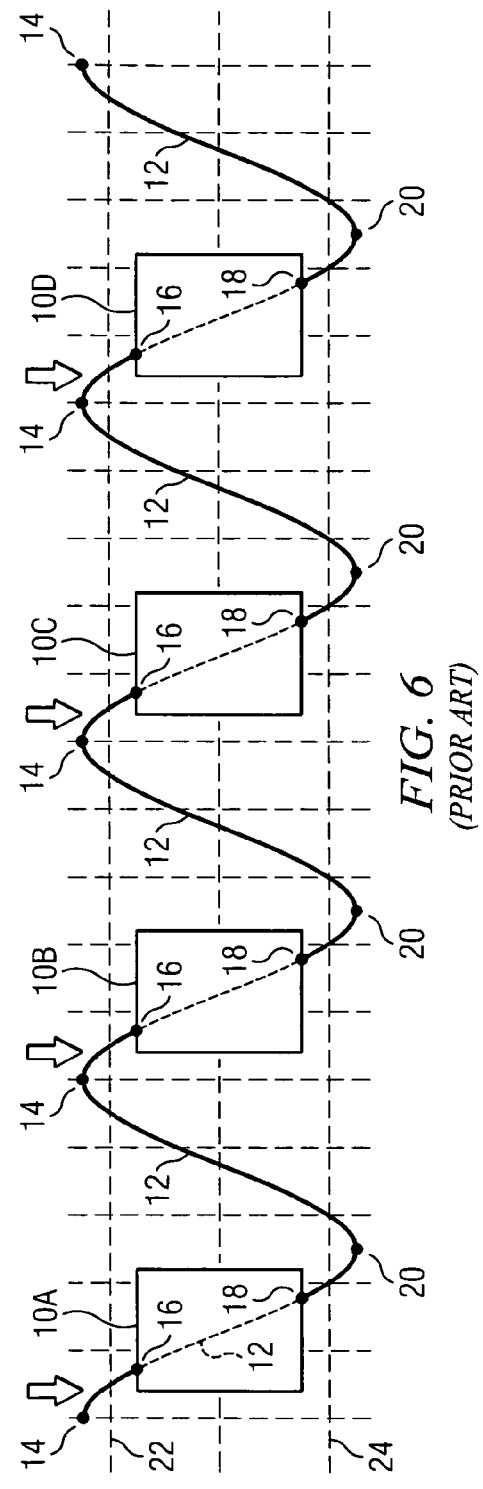
FIG. 4A
FIG. 4B
FIG. 6
(PRIOR ART)

METHOD FOR SYNCHRONIZING AN IMAGE DATA SOURCE AND A RESONANT MIRROR SYSTEM TO GENERATE IMAGES

TECHNICAL FIELD

The present invention relates to video display and laser printer systems comprising a high speed scanning mirror for generating scan or image lines to produce an image and a method of synchronizing a data stream that represents the scan lines with the high speed mirror.

When used with a video display, the invention further relates to synchronizing a low frequency mirror that moves the modulated light beam substantially orthogonal to the movement of the high speed mirror to position the scan lines. More particularly, the invention relates to synchronizing the movement of the low frequency mirror with the start point of an image frame, and properly spacing each of the scan lines.

When used with a laser printer, the high speed mirror operates the same as when used with a video display. More specifically, the stream of data representing a scan line is synchronized with the high speed mirror. However, the start point of a printed page is synchronized to the placement of a new sheet of paper, and the spacing of print lines is synchronized with movement of the receiving medium (e.g. a rotating drum).

BACKGROUND

In recent years torsional hinged high frequency mirrors (and especially resonant high frequency mirrors) have made significant inroads as a replacement for spinning polygon mirrors as the drive engine for laser printers. These torsional hinged high speed resonant mirrors are less expensive and require less energy or drive power than the earlier polygon mirrors.

As a result of the observed advantages of using the torsional hinged mirrors in high speed printers, interest has developed concerning the possibility of also using a similar mirror system for video displays that are generated by scan lines on a display surface.

Standard CRT (cathode ray tube) video systems for displaying such scan-line signals use a low frequency positioning circuit, which synchronizes the display frame rate with an incoming video signal, and a high frequency drive circuit, which generates the individual image lines (scan lines) of the video. In the prior art systems, the high speed circuit operates at a frequency that is an even multiple of the frequency of the low speed drive and this relationship simplifies the task of synchronization. Therefore, it would appear that a very simple corresponding torsional hinged mirror system would use a first high speed scanning mirror to generate scan lines and a second slower torsional hinged mirror to provide the orthogonal motion necessary to position or space the scan lines to produce a raster "scan" similar to the raster scan of the electron beam of a CRT. Unfortunately, the problem is more complex than that. The scanning motion of a high speed resonant scanning mirror cannot simply be selected to have a frequency that is an even multiple of the positioning motion of the low frequency mirror.

More specifically, the positioning motion and, consequently, the low frequency drive signal must be tied to the incoming image frame rate of the video signals to avoid noticeable jumps or jitter in the display. At the same time, however, the high frequency mirror must run or oscillate at substantially its resonant frequency, since driving a high-Q mirror at a frequency only slightly different than the resonant frequency will result in a significant decrease in the amplitude of the beam sweep (i.e. reduce the beam envelope). This would cause a significant and unacceptable compression of the image on the display. Therefore, the high speed mirror drive is decoupled from the low speed mirror drive. That is, as mentioned above, the high speed drive signal cannot simply be selected to be an even multiple of the low speed drive signal.

However, in a video display, each frame of incoming video signals representing video pixels (such as might be received from a DVD player or a VCR player) must still be faithfully reproduced. This means, each pixel of each successive frame of video must be properly located on the screen of the display if distortions are to be avoided. Also of course, if complete image frames are lost or dropped, artifacts in the display would clearly be observed. Therefore, as described above in a torsional hinged mirror based video system, the low frequency mirror drive must still be synchronized to the flow rate of the incoming video signals. At the same time, however, the high speed mirror must oscillate at its resonant frequency. Further, the problems discussed above are even further complicated if there has been some degradation of the video signal. For example, if the source of the video signals is a VCR, one common problem such as stretching of the VCR tape could vary the incoming frame rate, which must also be dealt with. Additionally, tracking or synchronizing the low speed mirror and the frame rate should be done in a way that minimizes transients from discontinuities in the drive waveform.

Therefore, a mirror based video system that overcomes the above mentioned problems would be advantageous.

SUMMARY OF THE INVENTION

These and other problems are generally solved or circumvented, and technical advantages are generally achieved by the embodiments of the present invention, which provide a method of synchronizing the low speed mirror movement of a mirror display system with an incoming frame of video signals and also synchronizing the data stream that generates each scan line (i.e. contains data for each pixel) to the scanning mirror.

More specifically, the method comprises the step of generating a cyclic drive signal (such as for example a sinusoidal or repetitive triangular drive signal) to position the low frequency mirror. The cyclic drive signal will include upper and lower peak portions (i.e. where the drive signal reverses the mirror direction), and display portions. A display portion is sandwiched between a lower peak portion and an upper peak portion. The display portion of the low frequency drive signal corresponds to a range of the mirror positions where an image or partial image is generated in the display. The "frame" of video may comprise a complete image or a partial image. As an example, an image may be comprised of interlaced odd and even fields and a first frame may be the even field and the second frame the odd field such that the two frames are required for a complete image. Further, each of the odd and even fields may be divided in two parts such that four frames of the data are required for a complete image. It will also be appreciated, that each of the received frames of video signals may arrive at a fixed frequency or the frames may vary from a fixed frequency, as in the case of a stretched VCR tape discussed hereinafter. The invention may also be used to synchronize the mirror to a desired precise waveform having a standard frequency, for example, of 59.92 Hz.

Therefore, according to the invention, to synchronize the low speed positioning mirror with the incoming data frame rate, one of the peak or turn around portions of the cyclic drive signal is adjusted by compressing or expanding so that each frame of video starts at the same position on the low frequency drive signal. An "arming" signal is then generated subsequent to an adjustment of the low frequency waveform. The timing of the "arming" signal is calculated so that the frame start point is always at a precise location on the display (or sheet of paper). However, it will also be appreciated that the data signals representing each scan line must also be distributed so that the first pixel of the each scan line is always positioned at substantially the same location on the high speed beam sweep. Consequently, the data for each scan line is stored in a buffer so that the distribution of the data during a beam sweep can be synchronized with the scanning mirror.

According to another embodiment, the step of generating the low speed cyclic drive signal may comprise repetitive generation of a series of discrete values that in turn generate one cycle of the drive signal, and the step of adjusting the peak portions comprises increasing the number of discrete values making up the peak portion that drives or positions the low frequency mirror. These additional discrete values may expand the peak portion (i.e. increase the cycle time). Alternately, in some situations, the number of discrete values may be decreased to compress the peak portion (i.e. decrease cycle time) of the drive signal. Such increasing or decreasing the peak portion of the low frequency drive signals may be accomplished according to one embodiment of the invention by generating a "surplus" or excess number of discrete values than are required for one complete cycle time. All of the discrete values are stored in a circular buffer. The circular buffer creates the cyclic motion of the drive signal. The required time to complete the turn around or peak portion of the drive signal for each cycle may then be provided by positioning the restart or wrap around pointer to include the proper number of the surplus discrete values.

According to yet another embodiment of the invention, the position of the low speed mirror "arms" the system for each frame at a selected location(s) in its travel; and the position of the high speed resonant mirror generates a "trigger" signal, which initiates the release of a data stream representing one complete scan line from a buffer at one or more location(s) in its travel. It sill be appreciated that there may be many "trigger" points, which represent the scan lines, for each "arming" point, which represents the start of a frame.

In one embodiment, the "arming" signal is based on sensors, which monitor the position of the low-speed mirror. Alternately, in another embodiment, the position is inferred based on the driving waveform, which will have a reasonably constant phase lead relative to the actual position. This embodiment may allow the elimination of sensors resulting in lower system cost and complexity. Due to the variation in phase between the high speed mirror drive signal and mirror position, a sensor will typically be required to generate the "trigger" signals.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A and 3B show how the cyclic low speed drive signal of FIG. 1A is stretched or compressed according to the teachings of the invention to properly synchronize the low speed mirror to the incoming video signal;

FIGS. 4A and 4B show a circular buffer with an adjustable pointer that determines the wrap around or end point of the buffer;

FIG. 6 is a prior art figure showing displays of video frame high frequency where the scan mirror operates at an even multiple of the low frequency positioning mirror.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
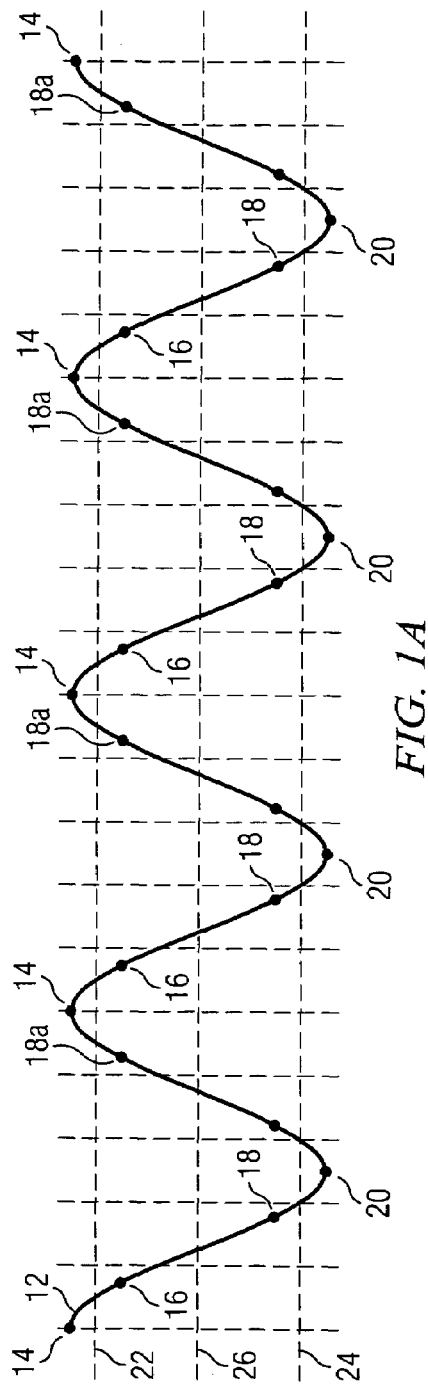
FIGS. 1A and 1B illustrate, respectively, low speed (scan line positioning) and high speed (resonant scanning) cyclic signals for driving the mirrors about their axis.
Figure 1B:
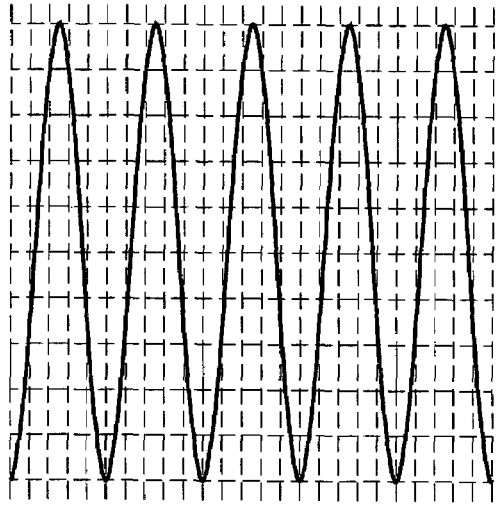

Referring now to FIGS. 1A and 1B along with prior art FIG. 6, there is illustrated the interaction of a high speed horizontal scanning drive signal and a low speed (vertical) or scan line positioning signal used to control a prior art electronic display formed by a raster scan, such as for example a CRT display. The terms "horizontal", used with respect to scanning drive signals, and "vertical", used with respect to the beam positioning signals are for convenience and explanation purposes only, and it will be appreciated by those skilled in the art that the scan lines could run vertically and the positioning signals could position the vertical scan lines horizontally across a display screen contrary to the embodiment shown and discussed with respect to FIGS. 1A and 1B.

As shown in FIG. 6, four typical frames of video such as indicated by image boxes 10a, 10b, 10c, and 10d are generated during the same (substantially linear) portion of each cycle of the slow speed sinusoidal drive signal represented by curve 12. More specifically, if the slow speed positioning signal has a frequency of 60 Hz, then in the example of FIG. 6, sixty different frames of video (i.e. complete images) rather than the four as illustrated will be generated in one second. Therefore, if as shown in the figure, the frequency of the high speed or scanning drive signal is an even multiple of the frequency of the low speed signal, then each successive video frame will start and be located at the same position on a display screen. For example, if transition point 14 is at the exact peak of the drive signal, it represents both the end point of each cycle of the positioning slow speed drive signal and the start point of the next cycle of the drive signal. Therefore, point 16 will be selected to always occur a certain time period thereafter and can be selected to represent the start point (or placement of the first line) of each frame. Likewise point 18 will be the end point (or placement of the last line) of each frame. In the prior art example of FIG. 6, the mirror travels in a reverse direction between the lowest point 20 and peak point 14 of the cycle as the slow speed signal and the mirror are repositioned for the next frame of video signals. As discussed above, the portion of the drive signal between points 16 and 18 is substantially linear and is referred to hereinafter as the display portion of the slow speed drive signal, whereas the transition peak point 14 and the lowest point 20 not only are not located during a linear portion of the signal, but as mentioned represent where the positioning drive signal actually stops and reverses the direction of the mirror. These reverse or "turn-around" portions (above line 22 and below line 24) of the drive signal are referred to hereinafter as the upper and lower peak portions or transition points of the drive signal.

Figure 1C:
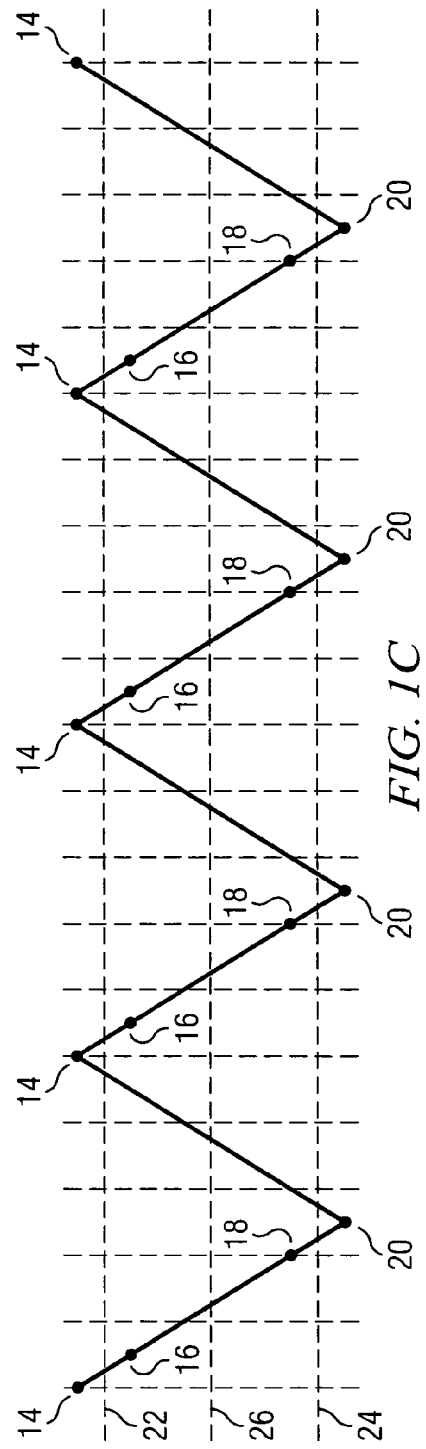
FIG. 1C is the same as FIG. 1A, except a triangular low speed drive signal is illustrated rather than a sinusoidal drive signal.

FIG. 1A is similar to FIG. 6 and represents the positioning or slow speed drive signal according to the present invention, but does not illustrate the frames of video. FIG. 1B represents the scanning drive signal and/or the corresponding scanning position of a resonant mirror according to the teachings of the present invention, but is not to scale with respect to FIG. 1A and is not likely to be an even multiple frequency of the slow speed drive signal. As an example, the resonant frequency of a scanning torsional hinged mirror, such as illustrated in FIG. 1B, may be on the order of 20 kHz or greater. FIG. 1C is similar to FIG. 1A, except as shown, the slow speed cyclic drive signal has a repetitive triangular shape rather than a sinusoidal shape. The portion of the curve above and below lines 22 and 24 respectively still represent the upper and lower peak (or turn-around) portions of the mirror movement, and the portion of the curve between lines 22 and 24 still represent the display portion of the signal and/or mirror movement where the video frame is generated. Line 26 in both FIGS. 1A and 1C represent the "0" voltage point or zero crossover point of the cyclic signals.

Figure 2B:
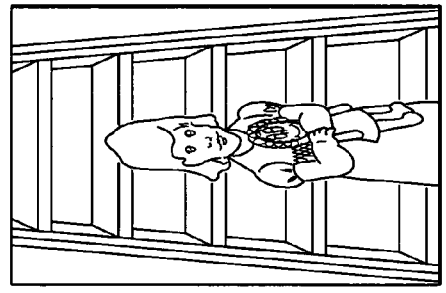
FIG. 2B illustrates an image frame similar to that of FIG. 2A, except the resonant mirror is operated off of resonance and at less than full sweep amplitude.
Figure 2A:
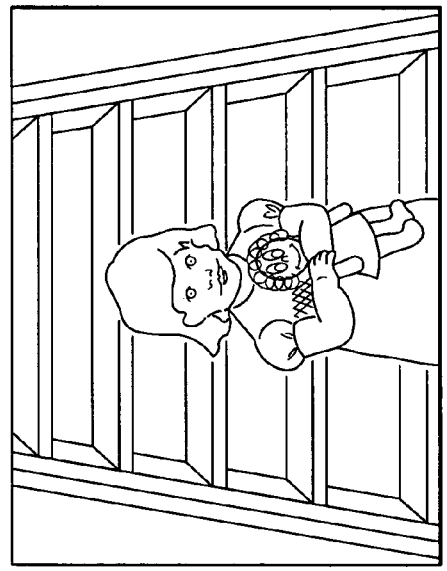
FIG. 2A illustrates an image frame generated by a torsional hinged mirror operating at resonant frequency and at full sweep amplitude.

Therefore, it will be appreciated that if the scanning speed of a torsional hinge resonant mirror as represented by the graph of FIG. 1B could simply be selected to be an even multiple of the speed of the slow speed positioning mirror, synchronization of a mirror display system could be accomplished in a manner similar to that for a raster scan electron beam display system. Unfortunately, although resonant mirrors can be manufactured within reasonable tolerances, the actual resonant frequencies cannot be controlled so that the resonant speed of each mirror of a group of mirrors formed on a silicon wafer could be precisely manufactured as an even multiple of a speed selected for the slow speed mirror. Further, as was disclosed above, driving a high speed resonant mirror at a speed only slightly off of its resonant frequency can drastically reduce the sweep amplitude of the mirror, or alternately the mirror may require a significant increase in the energy required to drive the mirror so as to maintain an equivalent sweep amplitude. FIG. 2A illustrates a printed page or frame of video generated by a resonant mirror operating at resonance and at full amplitude. FIG. 2B illustrates the same printed page or frame of video where the resonant mirror is operating off of its resonant frequency and wherein the sweep amplitude is significantly reduced.

Also as was discussed above, for some types of video storage media, a stream of data signals comprising adjacent frames of video may be non-periodic. That is, successive data frames are not always received with the same timing, and consequently, would not appear at the same location on the display without compensation. As an example, if the video storage media is a VCR tape, a portion of the tape may be stretched, and consequently, the frames of data will not be received with the same timing. That is, each frame of data is not constant and would not be precisely located at the same position on the display without some means of compensation. The present invention solves these various issues by allowing the high speed mirror to run at its resonant frequency and asynchronously controlling or coupling the cyclic beam positioning signals that drive the slow speed or positioning mirror to each frame of the incoming video signals. The data or signals comprising an image frame often include a timing signal (or sync or interrupt signal) that can be used to precisely determine the start or end of the next image frame. This allows the slow speed mirror to be synchronized with the incoming data signals so that the image frame may be properly positioned to start at the same point of the display portion during the slow speed mirror movement for each image frame. More specifically, as discussed above, an "arming" signal is generated that is synchronized with the interrupt or timing signal that is included with each frame of data.

To accomplish this, a sinusoidal (or repetitive triangular shape) slow speed cyclic drive signal may be generated wherein each point (y) of the drive signal can be expressed as a function of time (i.e. $y=f(t)$), where "t" represents discrete time values from 0, 1, 2, 3, . . . etc. to an end point "T" such that after the end point is reached, the cyclic drive signal returns to the "0" or exact peak start value, and continually repeats. Therefore, assuming a frame of incoming video data is received and stored (or buffered), and if the first line of each frame is to be synchronized or positioned so that it is provided at a particular point of the slow speed signal subsequent to the interrupt, then adjusting the end point "T" of the drive signal allows the start position of each data frame on a display to be precisely located whether the frequency of the incoming data varies or is fixed.

It is also important, of course, that the data representing each scan or image line be distributed so that the data (pixels) are properly displayed or printed during the display portion of the sweep of the resonant mirror. More specifically, the first and last pixels of each line of an image must start and end at substantially the same location on the display or printed page for each sweep of the resonant mirror. To accomplish this, the display or printer system of this invention includes a sensing device or devices and the corresponding feedback circuitry to allow the actual position of the resonant mirror to be determined at one or more selected points during each sweep cycle. Consequently, the position of the scanning mirror can be accurately calculated at any point of time during the beam sweep. Further, a desired start and end point of an image line during a sweep of the resonant mirror can also be determined. Consequently, a "trigger" signal that accurately initiates the release of data from a buffer or storage is generated for each scan or image line to assure that the image signals representing a line of print or an image line are displayed precisely between the start and end points. The timing of the "trigger" signal can be calculated since the frequency of the scanning mirror is known as well as when the mirror is at one or more precise positions during a beam sweep. Thus, the signals representing each line of an image are initiated or released from the buffer by a "trigger" signal, and as will be appreciated, there will be several hundred "trigger" signals for each "arming" signal.

Referring to FIG. 3A, there is illustrated a condition where the incoming frame of data is received at a rate slightly slower than nominal. That is, the time between successive transition peak points "T" 14 is greater than nominal. Consequently, to assure proper placement of the first scan line, the peak portion of the cyclic drive signal is delayed or expanded by a computed amount or time period as representative by the double arrow 30, extending between the end point 14a of a cycle and the exact peak or start point 14b of the next cycle. As shown, this addition time period 30 delays or "expands" the top peak portion of the drive signal and consequently the exact peak or start point 14b of the next cycle. Thus, the start point 16 of each of data frame can be determined and precisely positioned at the same y-axis location on the display screen or media by referring to the following equations:

$$y(t)=A^*\cos(2^*\pi^*t/T) \text{ for } t=0 \text{ to } T; \text{ and} \qquad 1)$$

$$y(t)=y(T) \text{ for } t \geq T_{nom} \qquad 2)$$

where A=amplitude of drive signal and $T_{nom}$ is the nominal number of samples.

FIG. 3B illustrates the opposite condition, wherein successive transition points occur more rapidly than the transition point 14 of the nominal sinusoidal drive signal. Consequently, the peak portion of the positive signal is compressed or occurs earlier than nominal to assure that each image frame is properly placed. As shown, the positive peak portion of the drive signal is compressed by removing portions of the drive signal between the end point 14a and the exact peak or start point 14b. This effectively reduces the count "T" in the above discussed equations. Further depending on the resolution chosen for discrete time steps, this process may amount to adding or subtracting a single sample, i.e., "T" may be constant to within a single count.

It is also important to note that adjusting (expanding or compressing) the peak portions of the cyclic slow speed drive signal is shown as being accomplished in the upper peak portions of the drive signal (the portion above line 22), while the video signal is blanked or cut off. It should also be appreciated that although FIGS. 3A and 3B illustrate the adjustment as taking place in the upper or positive peak portions, similar and effective adjustments could be made in the lower peak portion (i.e. portions below line 24). Alternately, a portion of the required adjustment could take place in the upper peak portions and another portion in the lower peak portions.

It should also be appreciated that although the above detailed discussion has been with respect to a "sinusoidal" slow speed drive signal, such as shown in FIG. 1A, the discussion is equally applicable to the repetitive "triangular shaped" drive signal such as illustrated in FIG. 1C. In addition, in the embodiments shown, the appropriate adjustment could also occur during the return or travel of the drive signal back to the start point (i.e. between points 20 and 14). However, to increase brightness, other embodiments of mirror display systems may provide an image frame during the return portion of the slow speed signal as well as the display portion so that the adjustment steps are preferably limited to the upper and lower peak portions as discussed above.

An effective method of expanding or compressing the peak portion of the drive signal between the end point 14a of one cycle and the exact peak or start point 14b of the slow speed drive signal of the next cycle is to generate a table of values representative of a cyclic signal such as for example a sinusoidal cyclic signal as illustrated in FIG. 1A or a repetitive triangular shaped signal as illustrated in FIG. 1C. These values are stored in a circular buffer memory such as buffer 32 illustrated in FIGS. 4A and 4B that are provided at a fixed clock rate to a D/A converter, which in turn provides the drive signal used to position the slow speed mirror. As shown in FIG. 4A, circular buffer 32 includes a multiplicity of storage locations 34a-34n for storing the table of values as discussed above. Further, for purposes of explanation only, buffer 32 illustrates a first group 36 of stored values representing the display portion of the drive signal, a second group 38 representing the bottom or lower peak portion, a third group 40 representing the blanked retrace portion of the drive signal, and a fourth group 42 representing the top or upper peak portion of the drive signal. However, since according to the described embodiment, it is necessary to always start at the exact peak 14b of the signal waveform, group 42 of the stored discrete values is illustrated as being divided into portions 42a and 42b. Portions identified by 42a represent a first portion of the top or upper peak portion 42 having a fixed and minimum number of discrete values, and reference number 42b represents discrete values for a second or adjustable portion of the drive signal. As discussed above and as will be appreciated by those skilled in the art, each discrete value is clocked out of the circular buffer 32 in sequence and then as indicated by dashed arrow 44 when the last value (representing end point 14a) of stored group 42 as determined by pointer 46 is clocked out of the buffer, the sequence starts over at the beginning location 34a of the buffer. Location 34 is the exact peak value of the drive signal and corresponds to peak or start point 14b of FIGS. 3A and 3B. This process is continually repeated to provide the cyclic drive signal. This arrangement suggests the description of the buffer as being a "circular buffer." In a typical circular buffer, the number of stored values may be the same or fixed for each cycle. However, to allow the positive transition portion of the cyclic signal, represented by the group 42 of discrete values, to be adjusted by expansion or compression as discussed above and according to the present invention, the top or positive peak portion 42 (or according to an alternate embodiment the bottom peak portion 38) includes additional discrete values stored in additional storage locations of the buffer 32. The extra drive signal points or discrete values adjust the timing of the peak 14b of the signal waveform. Thus, the number of discrete values between the end point (as calculated) 14a and the start point 14b of the buffer at "T" is adjusted by positioning the pointer 46 between the extreme left and the extreme right locations as indicated in FIG. 4B to include a selected or calculated number of the additional discrete values necessary to achieve the desired synchronization.

Simply put, to expand the transition portion of the drive signal, a larger number of the discrete values are included by pointer 46. On the other hand to compress the transition point, the pointer 46 is moved or adjusted to include fewer of the discrete values. To assure the necessary flexibility of the system, portion 42 of the buffer will always include the number of discrete values (indicated at 42a) required for a minimal allowable complete cycle. To this minimum number of discrete values, a sub-group of additional discrete values (42b) are included that will be sufficient to expand the cycle to a level well beyond which would normally be required. Thus, upon receiving the timing or interrupt signal, the number of additional discrete values in sub group 42b required to expand or compress the drive cycle is determined and the pointer appropriately moved. Therefore, when the buffer provides the value at the last location as indicated by pointer 46, representative of end point 14a, it then moves to a selected location 34a of the beginning portion of the buffer representing the peak point 14b. Thus, the period for each cycle of the slow speed drive signal is determined and adjusted for each image frame to assure proper positioning of the image on the display screen.

Figure 5A:
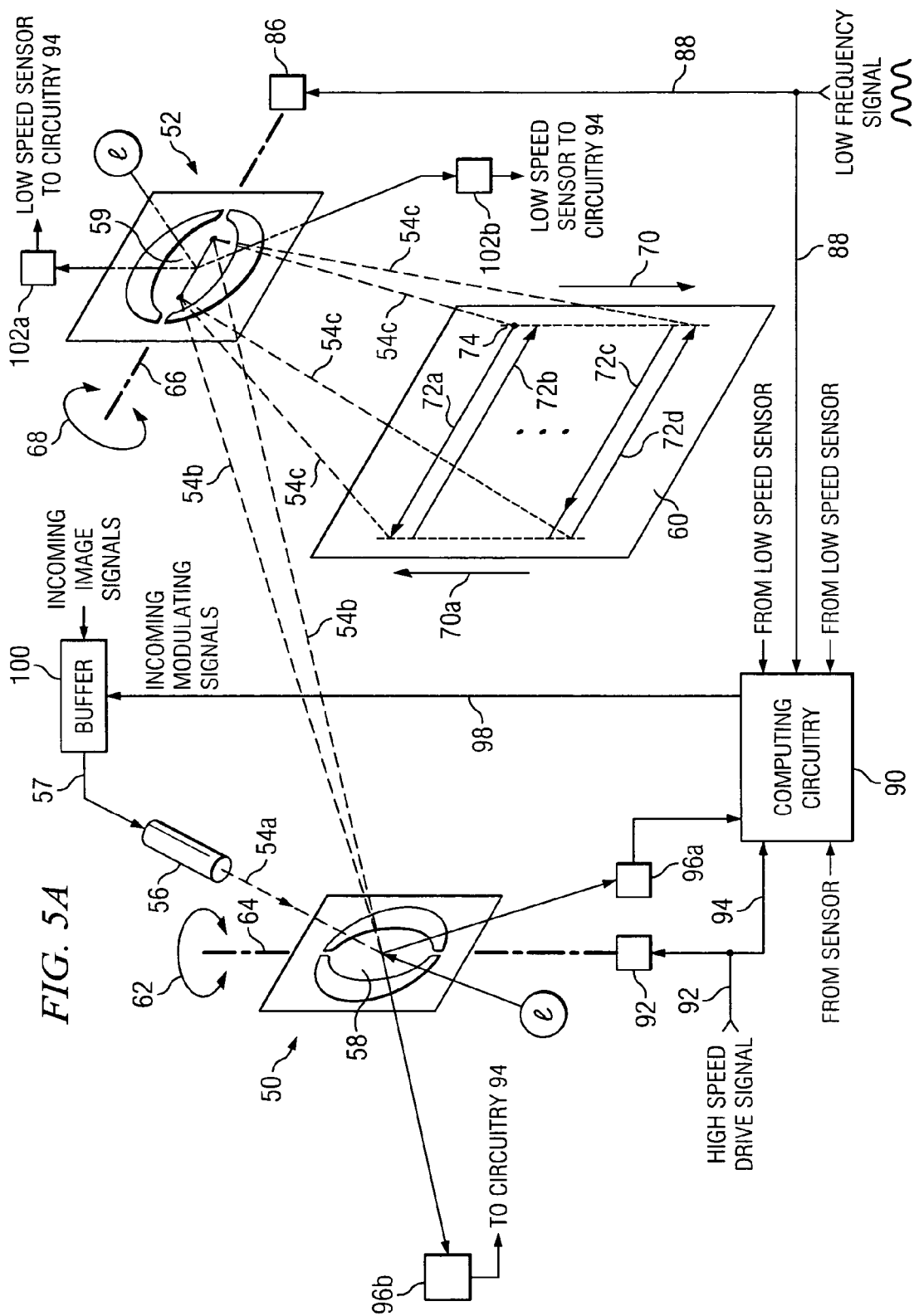
FIGS. 5A and 5B are is a simplified diagrams illustrating a torsional hinged mirror based display system using two single axis mirrors.

Referring now to FIG. 5A, there is a perspective illustration of an embodiment of the present invention as used in a visual display that uses two separate single axis mirrors that pivot about their torsional hinges. As shown, a high frequency or scanning single axis torsional hinged mirror 50 may be used in combination with a low frequency or positioning single axis torsional hinged mirror 52 to provide a raster scan. A light beam 54a from a source 56 is modulated by incoming signals on line 57 to generate pixels that comprise the scan lines. The modulated light beam 54a impinges on the high frequency resonant mirror 50 and is reflected from surface 58 as sweeping light beam 54b to the reflecting surface 59 of the low frequency positioning mirror 52. Positioning mirror 52 redirects the modulated light beam 54c to a display surface 60, which may be a screen or other light sensitive medium. The oscillations of the high frequency scanning mirror 50 (as indicated by arcuate arrow 62) around pivot axis 64 results in light beam 54c (the scan lines) sweeping across the surface 60, whereas the oscillation of the positioning mirror 52 about axis 66 (as indicated by double headed arrow 68) results in the scan lines being positioned vertically (or orthogonally to the scan lines) on the display surface 60. It is again noted that the terms horizontal and vertical are for explanation purposes only. Therefore, since the scanning motion of light beam across display surface 60 may occur several hundred or even a thousand times during the orthogonal movement in one direction of the low speed positioning mirror 52, as indicated by arrow 70, a raster scan type image can be generated (or printed) on display surface 60 as indicated by image lines 72a, 72b, 72c, and 72d. The light beam 54c may also be used to paint another image in the reverse direction as indicated by arrow 70a. To do this, the mirror travels back to the starting point 74 and then starts over.

Figure 5B:
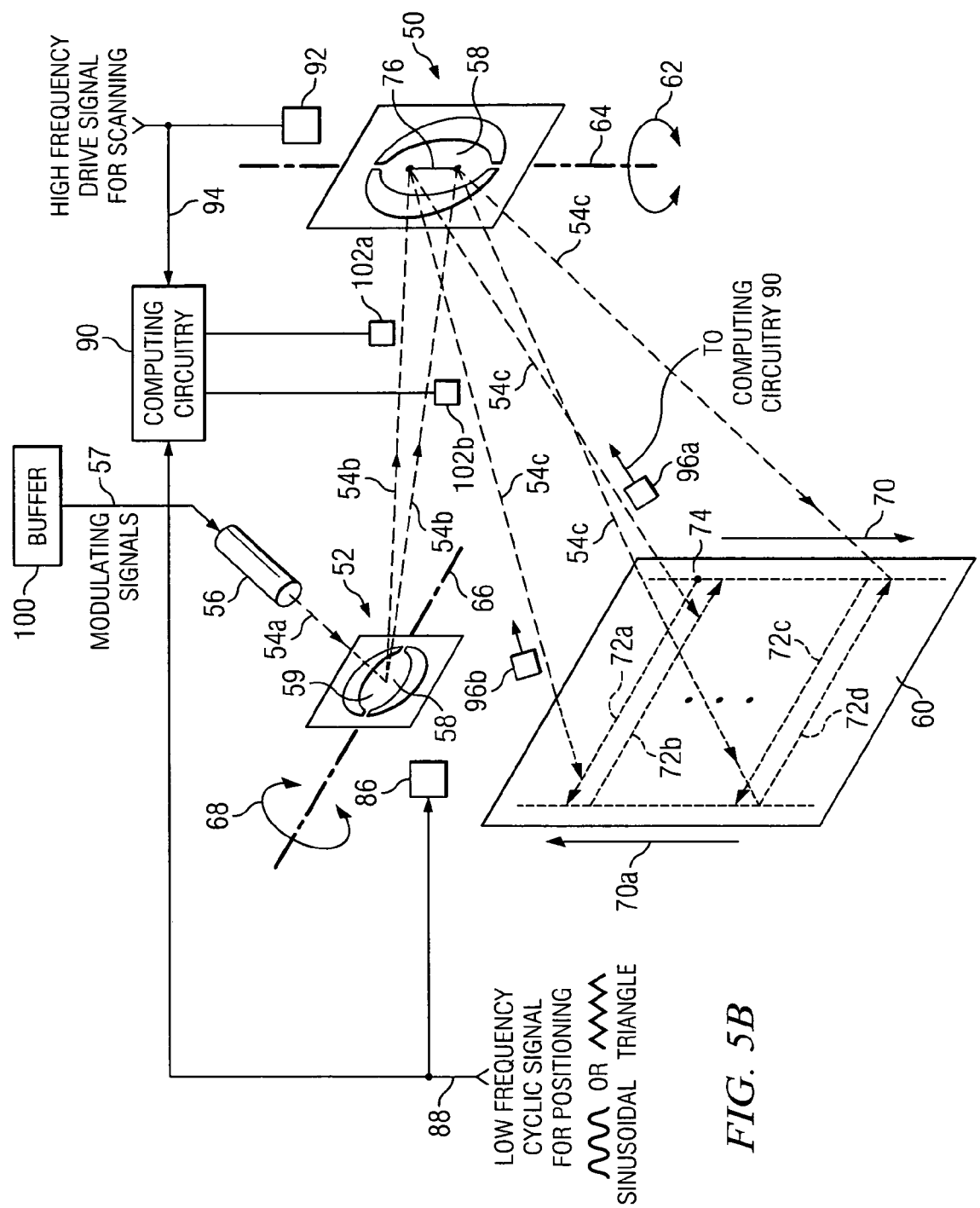

Referring to FIG. 5B, there is another perspective illustration of an embodiment of the present invention using two separate single axis mirrors that pivot about their torsional hinges. As shown, a high frequency or scanning single axis torsional hinged mirror 50 may be used in combination with a low frequency or positioning single axis torsional hinged mirror 52 to provide a raster scan type visual display. A light beam 54a from a source 56 is modulated by incoming video signals and impinges on the low frequency positioning mirror 52. The modulated light beam 54b is then reflected off of mirror surface 59 to reflecting surface 58 of the high frequency oscillation or scanning mirror 50, which redirects the modulated light beam 54c to display screen or surface 60. The oscillations (as indicated by arcuate arrow 62) of the scanning mirror 50 about axis 64 results in light beam 54c sweeping across display screen 60.

It will also be appreciated that oscillations of the positioning mirror 52 about axis 66 as indicated by double headed arcuate arrow 68 will move the reflected modulated light beam 54b with respect to scanning mirror 50 such that the light beam 54b moves orthogonally to the scanning motion of the light beam as indicated by line 76 in the middle of reflecting surface 58. Thus, it will be appreciated that since the high frequency scanning motion of the light beam 54c as indicated by image lines 72a, 72b, 72c, and 72d on display screen 60 occurs several hundred or even a thousand times during a single orthogonal movement of the low frequency positioning mirror, a raster scan type visual display can be generated or painted on display screen 60 as indicated by arrow 70. The light beam 54c then returns or travels back to the starting point 74 as indicated by arrow 70a.

The above discussion is based on two single axis torsional hinged mirrors. However, as will be appreciated by those skilled in the art, a single dual axis torsional hinged mirror, such as mirror structure 80 shown in FIG. 5C may used to provide both the high frequency scanning motion about axis 64a as indicated by arcuate arrow 62, and the positioning or orthogonal motion about axis 66, in the same manner as the oscillation of the individual mirrors 50 and 52 discussed in the embodiment of FIGS. 5A and 5B. The remaining elements of FIG. 5C operate the same as in FIGS. 5A and 5B and consequently carry the same reference number. It should also be noted, however, that the modulated light beam 54a is only reflected one time and, therefore, the reflected beam carries reference number 54d.

Figure 5C:
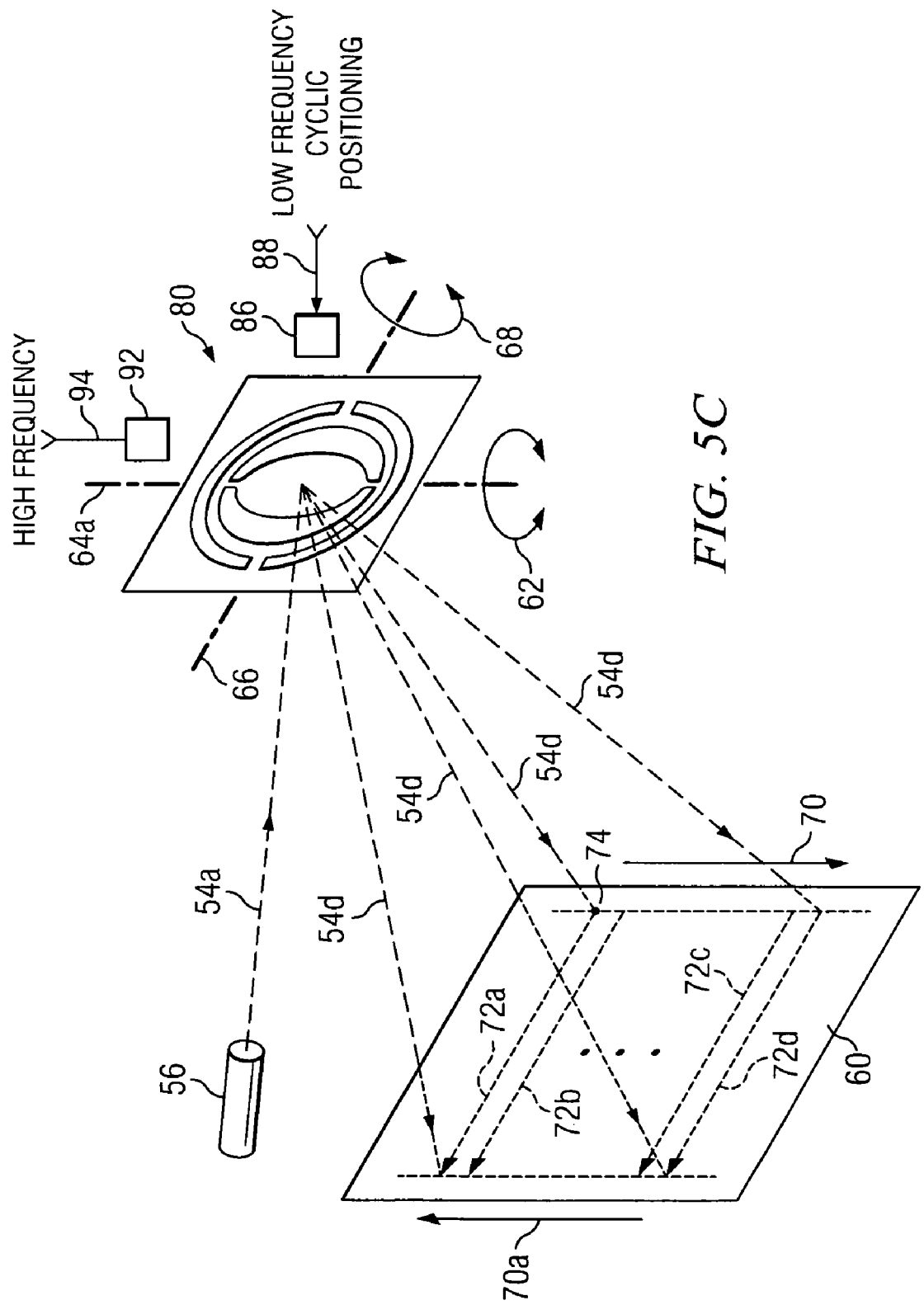
FIG. 5C is a simplified diagram illustrating another embodiment comprising a single dual axis mirror in place of the two single axis mirrors.

As will be appreciated, the systems discussed with respect to FIGS. 5A, 5B, and 5C are visual display systems. However, as should also be appreciated, those portions of the discussed system that relate to the high speed resonant scanning mirror are equally applicable to laser printer systems. In a printing system, the orthogonal motion that positions the hundreds of lines to form a printed page is accomplished by a rotating drum rather than a slow speed positioning mirror. However, the "arming" signal generated by a laser printer could be synchronized with a sheet of paper being properly positioned to receive lines of print, as opposed to the "arming" signal generated in a visual display system representing the low frequency mirror being at the frame start point.

As was discussed above, the illustrated embodiments relate primarily to synchronization of the incoming stream of video data signals with the motion of the slow speed positioning mirror. In addition, the synchronization of the flow of (a scan line of) data signals with respect to the actual position of the resonant mirror as determined by sensors and a feedback circuit was briefly discussed. As was also discussed above, a "trigger" signal is generated to initiate the release of a data stream from a buffer so that the image pixels are precisely positioned or distributed across the beam sweep.

As will also be appreciated by those skilled in the art, according to another embodiment, the motion and corresponding position of the low frequency positioning mirror can be determined and/or reasonably predicted or calculated for any selected instant in time from the actual signals used to drive, the low frequency mirror about its respective axis. Further, for most embodiments the low frequency mirror operates satisfactorily without the use of external sensors to provide feedback of the actual position of the low frequency mirror. Therefore, referring again to FIGS. 5A, 5B, and 5C as shown, there is a drive mechanism 86 for positioning the low speed mirror 52 in response to a low frequency cyclic signal such as illustrated in FIGS. 1A and 1B and which is received on input line 88. This low frequency cyclic drive signal is also provided to computing circuitry 90 and, as discussed above, may be used to determine or estimate the position of mirror 52.

Similarly, there is included a high speed drive mechanism 92 responsive to high frequency signals on input line 94 for driving the high speed mirror at its resonant frequency. The high frequency drive signals are also provided to computing circuitry 90. However, it should be noted, that the position of the high speed resonant mirror 50 cannot accurately be determined or inferred from the drive signal, and consequently, as discussed above, an external sensor 96a (or sensors 96a and 96b) along with a feedback circuitry connected to computing circuitry 90 is required to determine the position of the high speed resonant mirror. Then, as shown, the "trigger" signal is calculated and provided on line 98 to buffer 100 to initiate the release or distribution of the data stream for each scan line. As mentioned above, this aspect of the invention is also applicable to a laser printer system.

FIGS. 5A and 5B also illustrate that sensors 102a and 102b may be included to monitor the actual position of the low frequency mirror, just as sensors 96a and 96b were used to monitor the actual position of the high speed mirror. However, as was also mentioned, for most applications, it is not necessary to include such sensors for the low speed mirrors.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the structure or methods and steps described in the specification. As one of ordinary skill in the art will readily appreciate from the disclosure of the present invention, structure, methods, or steps, presently existing or later to be developed, that perform substantially the same function or achieve substantially the same result as the corresponding embodiments described herein may be utilized according to the present invention. Accordingly, the appended claims are intended to include within their scope such structures, methods, or steps.

What is claimed is:

1. In a video display system comprising a high speed scanning mirror for generating scan lines of a frame of video and a low frequency mirror for orthogonally positioning said scan lines, a method of synchronizing said low frequency mirror with frames of incoming video signals comprising the steps of:
   generating a cyclic drive signal to position said low frequency mirror along a path defining upper and lower peak portions and a display portion;
   receiving said frames of incoming video signals for being displayed, each said frame including a timing signal;
   adjusting one of said upper and lower peak portions of said cyclic drive signal to synchronize said timing signal of each incoming frame of said video signals with said cyclic drive signal; and
   displaying each said frame of video signals during said display portion of said cyclic drive signal.

2. The method of claim 1 wherein the period of said received frames of incoming video signals varies.

3. The method of claim 1 wherein each said frame of incoming video signal has a first line of pixels, and said display portion of said drive signal defines a pixel start location, and wherein said step of adjusting said peak portion of said cyclic drive signal synchronizes said pixel start location with said first line of pixels of said frame of video.

4. The method of claim 3 wherein said step of synchronizing said start location of said display portion with said first line of pixels comprises the step of expanding or compressing peak portions of said cyclic drive signal.

5. The method of claim 4 wherein said step of generating said cyclic drive signal comprises the step of generating a series of discrete values representative of at least one cycle of said cyclic drive signal.

6. The method of claim 5 wherein said step of expanding or compressing said peak portions of said cyclic drive signal comprises increasing the number of discrete values available for positioning said low frequency mirror to expand said one of said upper and lower peak portions of said cyclic drive signal or decreasing the number of discrete values available for positioning said low frequency mirror to compress one of said upper and lower peak portion of said cyclic drive signal.

7. The method of claim 5 wherein said values representative of at least one cycle is a minimum cycle and wherein said step of synchronizing said start location of said display portion comprises the step of generating discrete values in addition to said series of discrete values representative of said minimum cycle for expanding said peak portion of said cyclic drive signal;
   storing said series of discrete values and said additional discrete values in a circular buffer; and
   positioning a pointer of said circular buffer to include selected ones of said additional discrete values to synchronize said low frequency mirror with said frame of video signals.

8. The method of claim 7 wherein the pointer adjusts the point in the buffer where the circular buffer wraps back to the start location.

9. The method of claim 1 wherein said step of generating said cyclic drive signal comprises the step of generating either a substantially sinusoidal shaped drive signal or a repetitive substantially triangular shaped drive signal.

10. The method of claim 1 further comprising determining at least one of said upper and lower peak portions and said display portion of said cyclic drive signal by providing sensors to monitor the actual position of said low frequency mirror.

11. The method of claim 1 further comprising storing or buffering a data signal for each scan line, generating an arming signal when said low frequency mirror is at a selected position, generating a trigger signal each time said high frequency mirror is at a selected scan position, and initiating the delivery of said buffered data signal for each scan line by said trigger signal.

12. The method of claim 11 further comprising the step of sensing the actual position of said scanning mirror and generating said trigger signal from said sensed positions.

13. A method of synchronizing a frame of received video signals with a high frequency resonant scanning mirror and a low frequency scan line positioning mirror of a video display system comprising the steps of:
   storing signals representative of pixels of a frame of video to be displayed, said pixels organized in lines of said display;
   determining the position of said low frequency scan line positioning mirror and generating an arming signal representing the start point of a first scan line of a video frame;
   determining the position said high frequency resonant scanning mirror and generating a high frequency trigger signal representing the start of each scan line of said video frame;
   synchronizing the display of the first pixel of the first line of said frame of received video signals with said arming signal; and
   synchronizing the display of the first pixel of each scan line of said frame of received video signals with said trigger signal.

14. In an imaging system comprising a scanning mirror for generating a plurality of scan lines to form an image, a method of synchronizing said scanning mirror with image signals comprising the steps of:
   providing a drive signal to oscillate said scanning mirror at a known frequency;
   storing a multiplicity of image signals, in a buffer, said multiplicity of signals representing pixels comprising at least one of said plurality of scan lines;

determining a start point for said scan line;

determining when said oscillating mirror passes a predetermined location;

calculating the timing of a trigger signal in response to said known frequency and said oscillating mirror passing said predetermined location; and providing said trigger signal to initiate the release of said stored multiplicity of image signals to generate said scan lines.

15. The imaging system of claim 14 wherein said drive signal oscillates said at substantially its resonant frequency.

16. The imaging system of claim 14 wherein said imaging system is one of a video display system or a printing system.

17. The imaging system of claim 14 further comprising at least one sensor for determining when said oscillating mirror passes said predetermined location.

18. In an imaging system comprising a high speed resonant scanning mirror for generating a plurality of scan lines to form an image frame, and a low frequency mirror for orthogonally positioning said scan lines, a method of synchronizing said low frequency mirror with frames of incoming imaging signals, and synchronizing said imaging signals with said resonant scanning mirror comprising the steps of:

generating a cyclic drive signal to position said low frequency mirror along a path defining upper and lower peak portions and a display portion;

receiving said frames of incoming imaging signals for being displayed, each said frame including a timing signal;

adjusting one of said upper and lower peak portions of said cyclic drive signal to synchronize said cyclic drive signal with said timing signal of each incoming frame of said imaging signals;

generating an arming signal representative of the start point of an image frame;

providing a drive signal to oscillate said scanning mirror at its known resonant frequency;

sequentially storing a multiplicity of said imaging signals in a buffer, said sequentially stored multiplicity of signals representing pixels comprising each of said plurality of scan lines comprising said image frame;

determining a start point for each of said scan lines;

determining when said oscillating scanning mirror passes a predetermined location;

calculating the timing of "trigger" signals in response to said known frequency and said resonant mirrors passing said predetermined location;

displaying each said frame of imaging signals during said display portion of said cyclic drive signal in response to said arming signal; and releasing said stored multiplicity of image signals in response to said trigger signals to generate said plurality of scan lines.

* * * * *

UNITED STATES PATENT AND TRADEMARK OFFICE
CERTIFICATE OF CORRECTION

| | |
|---|---|
| PATENT NO. | : 7,599,011 B2 |
| APPLICATION NO. | : 11/336042 |
| DATED | : October 6, 2009 |
| INVENTOR(S) | : Oettinger et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twenty-eighth Day of September, 2010

David J. Kappos
*Director of the United States Patent and Trademark Office*